US011866304B2

(12) United States Patent
Torghele et al.

(10) Patent No.: US 11,866,304 B2
(45) Date of Patent: Jan. 9, 2024

(54) APPARATUS AND METHOD FOR CONTROLLING A SLEWING GEAR AND CRANE

(71) Applicant: Liebherr-Werk Nenzing GmbH, Nenzing (AT)

(72) Inventors: Richard Torghele, Bartholomaeberg (AT); Christof Gassner, Ludesch (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 173 days.

(21) Appl. No.: 17/651,007

(22) Filed: Feb. 14, 2022

(65) Prior Publication Data

US 2022/0340396 A1 Oct. 27, 2022

(30) Foreign Application Priority Data

Feb. 15, 2021 (DE) ..................... 10 2021 103 488.4

(51) Int. Cl.
*B66C 13/30* (2006.01)
*B66C 23/84* (2006.01)

(52) U.S. Cl.
CPC .............. *B66C 13/30* (2013.01); *B66C 23/84* (2013.01); *B66C 2700/082* (2013.01); *B66C 2700/084* (2013.01)

(58) Field of Classification Search
CPC ......... B66C 13/30; B66C 23/84; B66C 23/86; B66C 23/94; B66C 2700/082; B66C 2700/084
See application file for complete search history.

(56) References Cited

U.S. PATENT DOCUMENTS 5,159,813 A * 11/1992 Yoshimatsu ............ B66C 23/86 60/494
2010/0264106 A1* 10/2010 Kawai ..................... B66C 23/94 212/276

(Continued)

FOREIGN PATENT DOCUMENTS

DE 102008056022 B3 3/2010
DE 102011015286 A1 10/2012
WO 2013087048 A1 6/2013

OTHER PUBLICATIONS

DE 102011015286 A1 Machine Translation (Year: 2012).*

*Primary Examiner* — Michael R Mansen
*Assistant Examiner* — Juan J Campos, Jr.
(74) *Attorney, Agent, or Firm* — McCoy Russell LLP

(57) ABSTRACT

The present disclosure relates to an apparatus and to a method for controlling a crane slewing gear. The apparatus comprises a hydraulic motor for driving the slewing gear and for braking the slewing gear from a rotational movement. The slewing gear is kept stationary via a holding brake. A hydraulic brake circuit for controlling the holding brake, a load sensing device for measuring a load instantaneously taken up by the crane, and an orientation sensing device for measuring an instantaneous orientation of the crane and/or of at least one crane component are furthermore provided. In accordance with the disclosure, a hydraulic limitation circuit is provided by means of which a hydraulic pressure applied to the motor can be limited to a specific limit value. A control unit is furthermore provided that determines a maximum permitted torque and/or a parameter derived therefrom for a current slewing gear movement.

21 Claims, 3 Drawing Sheets

(56) References Cited

U.S. PATENT DOCUMENTS

| | | | | |
|---|---|---|---|---|
| 2011/0314802 | A1* | 12/2011 | Lastre | B66C 23/86 701/50 |
| 2012/0298608 | A1* | 11/2012 | Kraeutler | B66C 23/94 212/276 |
| 2014/0241842 | A1* | 8/2014 | Shiratani | E02F 9/2075 414/744.2 |
| 2021/0261387 | A1* | 8/2021 | Fukumori | B66C 13/46 |

* cited by examiner

APPARATUS AND METHOD FOR CONTROLLING A SLEWING GEAR AND CRANE

CROSS-REFERENCE TO RELATED APPLICATION

The present application claims priority to German Patent Application No. 10 2021 103 488.4 filed on Feb. 15, 2021. The entire contents of the above-listed application is hereby incorporated by reference for all purposes.

TECHNICAL FIELD

The present disclosure relates to an apparatus and to a method for controlling a crane slewing gear and to a crane, in particular a crawler crane, having such an apparatus.

BACKGROUND

Most cranes, revolving tower cranes, mobile cranes, and ship cranes or floating cranes can be named here, for example, comprise an upper part having a boom (also called a superstructure) that is rotatably supported on a lower section of the crane (also called an undercarriage) via a slewing gear. With revolving tower cranes, the superstructure can, for example, comprise the boom together with the counterboom and the mast that is supported on a stationary undercarriage, whereas with mobile cranes the undercarriage typically has a wheeled chassis or a crawler chassis for traveling the crane, whereas the rotatable superstructure can have rear ballast and further components such as a guying frame, a derrick boom, etc. in addition to the boom. With ship cranes, a float forms the undercarriage, while rail cranes have a rail vehicle travelable on tracks as the undercarriage.

SUMMARY

In all these cranes, a rotation of the boom (or of the boom system together with the buying and any ballast) about a vertical axis is effected by an actuation of the slewing gear (that can also be called a slewing ring). The crane slewing gear units are here typically drivable via one or more hydraulic motors and can have one or more holding brakes to fix the superstructure in a specific position. The latter are frequently likewise hydraulically drivable.

Accelerations from different influences that are caused from the outside via the environment and/or from the inside via the drive of the machine by the crane operator act on the total crane structure. The outside influence parameters inter alia include the interference parameters of wind and listing or tilting of the crane, the working load, the working radius, the dead loads, and the experience of the crane operator. The properties of the drive and the sensitivity of the crane control can be named as inside influence parameters.

As a rule, the crane rotating movement can be driven without restriction at maximum power and speed independently of the possible crane configurations and payloads. Depending on the crane configuration and the payload, however, an improper handling of the slewing gear in operation, with crawler cranes for example, or the actuation of an emergency stop with an abrupt braking of the rotational movement can result in in admissibly high transverse forces and thereby in damage or even in a toppling over of the crane.

On an emergency stop of stop category 0 or on a failure of the machine, there is typically an immediate standstill of the slewing gear. This produces a significantly higher load on the boom bearing structure. Without countermeasures, these circumstances result in significantly higher moments of inertias and further consequently in significantly higher loads on the boom bearing structure.

It is therefore the underlying object of the disclosure to reduce the risk in cranes having slewing gear of damage due to improper operation or external influences that are caused by inadmissibly high transverse forces or torques.

This object is solved in accordance with the disclosure by an apparatus and by a method.

An apparatus is accordingly proposed in accordance with the disclosure for controlling a crane slewing get that comprises the following:

- at least one hydraulic motor by means of which the slewing gear is rotationally drivable or brakable;
- at least one holding brake by means of which the slewing gear can be held stationary;
- a hydraulic brake circuit by means of which the holding brake is hydraulically controllable;
- a load sensing device by means of which a load instantaneously taken up by the crane can be sensed; and
- an orientation sensing device by means of which an instantaneous orientation of the crane and/or of at least one crane component can be sensed.

The measured load also in particular includes, in addition to the payload to be manipulated by the crane, pulling means or hoist ropes, load take-up means (e.g. hook blocks), attachment means, and/or suspension gear. The pulling means may include a winch. The attachment means may include a coupling such as a lift spreader. The load sensing device can be a force measuring strap that communicates a measurement signal to the control unit. The slewing gear is held in an unmoved position by means of the holding brake.

In accordance with the disclosure, a hydraulic limitation circuit is provided by means of which a hydraulic pressure applied to the motor can be limited to a specific limit value. Said hydraulic pressure can be a pressure difference.

A control unit is furthermore provided in accordance with the disclosure that may include a processor and that is connected to the limitation circuit and that is configured with instructions stored therein to carry out various operations as described herein. The control unit may communicate with one or more sensors to receive sensed data and signals, and may be coupled with one or more actuators for actuating the various elements described herein. For example, the control unit may have instructions stored in memory that when carried out by the processor determine a maximum permitted torque and/or a parameter derived therefrom for a current rotational movement of the slewing gear in dependence on at least the sensed load and the sensed orientation and to automatically limit an angular acceleration and/or angular speed of the slewing gear on this basis by a corresponding control or regulation of the limitation circuit. It is thereby ensured that the torques acting on the crane structure do not exceed the maximum permitted torque.

The parameter derived from the maximum permitted torque can be a maximum permitted angular acceleration. The corresponding control of the limitation circuit and thus of the slewing gear motor can take place in that a maximum permitted pressure, in particular a differential pressure, is calculated for the hydraulic system from the maximum permitted torque (or of the determined parameter) and the pressure in the hydraulic system is limited to a corresponding range. It can here be the pressure difference between the supply lines or control lines of the slewing gear motor responsible for a right movement and a left movement. The derived parameter can correspondingly be this permitted differential pressure that is used as the basis for the hydraulic control of the slewing gear. It is likewise conceivable that all the aforesaid parameters are calculated in the control unit.

In accordance with the disclosure, the limitation and brake circuits are connected or wired to one another and are configured such that on a failure of the control unit or on a triggering of an emergency stop of the crane, the slewing gear is automatically brakable while maintaining the slewing gear limitation. In other words, the load and geometry dependent slewing gear torque limitation in accordance with the disclosure in which it is ensured that the torques acting on the crane structure do not exceed the maximum permitted torque, even on a braking due to an emergency stop or an emergency standstill or a failure of the power supply of the crane.

Due to the apparatus in accordance with the disclosure, a load and geometry dependent slewing gear limitation while taking account of the relevant influence parameters is implemented in which the measurements and calculations required for the slewing gear limitation as well as the corresponding control or regulation of the slewing gear drive are automatically carried out. The crane operator does not have to engage actively in the regulation process so that the danger potential due to incorrect operation is minimized. An active influencing of the control and regulation process can even be fully precluded for safety reasons.

The approach in accordance with the disclosure is superior to the sole limitation of the boom head speed and/or acceleration to a permitted maximum value due to the typically very high number of possible equipment variants (in particular with mobile cranes). The interplay of the influences of payload and the boom's own masses thus changes significantly with the respective equipment states, for example. The maximum permitted payload (also called the SWL—"safe working load") is thus primarily definitive on the use of a short main boom, for example, while the boom system's own loads are primarily definitive on a use of a main boom having a long luffing needle.

All these influences of the orientation, equipment, payload, and further decisive features may be automatically considered by the slewing gear imitation in accordance with the disclosure and are automatically implemented in a safe rotational movement by a corresponding control of the drive.

The load and geometry dependent slewing gear torque limitation or slewing gear limitation protects the structure of the crane from overload due to the slewing gear. Due to the apparatus in accordance with the disclosure, the maximum possible torque on acceleration and/or deceleration of the slewing gear is limited to a maximum permitted value, both in operation and in an emergency, a power failure, or any other error case. The starting value here is in particular the maximum permitted angular acceleration of the superstructure with the existing utilization of the maximum structure payload. A maximum permitted torque or a maximum permitted pressure in the slewing gear is calculated therefrom corresponding to the crane configuration, the current load, and the current angular positions. In particular the slewing gear pressure is limited to this maximum permitted pressure by the system. If a constant deceleration time is to be ensured, the crane slewing speed can also be limited by the apparatus in accordance with the disclosure.

Provision is made in a possible embodiment that the control unit is configured to take current geometry data of the crane into account for the determination of the maximum permitted torque and/or the parameter derived therefrom. They can be read directly via suitable sensors and/or can be stored in the control unit or in a memory to which the control unit has access. It is thus conceivable that a database having the relevant data is stored in the crane for every possible equipment state and that the crane operator selects the current equipment state in advance (for example the current boom configuration and/or ballasting). An automatic detection of the instantaneous crane configuration via corresponding sensors is also possible. A provision of geometry data via a wireless communication channel is likewise conceivable, for example access of the control unit to a cloud having the stored data.

The geometry data may relate to an equipment state, a dimension, a mass, the location of a center of gravity, and/or a moment of inertia of the crane and/or of at least one of its components. The geometry data in particular include all the relevant component masses, center of gravity coordinates, and dimensions of the total machine or at least of the components of the crane decisive for the calculation of the permitted torque. The moments of inertia of the components can also be calculated from other geometry data by the control unit.

Provision is made in a further possible embodiment that the control unit is configured to take account of current environmental data for the determination of the maximum permitted torque and/or of the parameter derived therefrom, wherein the environmental data may relate to a wind direction and/or strength detected via at least one wind measurement device. The wind force acting on the crane can be calculated therefrom, in particular while making use of the previously mentioned geometry data of the crane. The wind measurement device may be positioned at the boom tip (for example at the tip of a luffing needle) and can comprise an anemometer. However, a plurality of wind measurement devices distributed over the crane can also be used for a more exact determination of the instantaneous wind force.

Provision is made in a further possible embodiment that the load instantaneously taken up by the crane and the instantaneous orientation of the crane can be sensed in real time and can be made available to the control unit. This in particular also applies to the measured environmental conditions, in particular the wind force. The measurements can take place at regular time intervals during the operating duration of the crane. The control unit is configured here to adapt the maximum permitted torque and/or the parameter for the current rotational movement of the slewing gear derived therefrom as well as the corresponding control or regulation of the limitation circuit in dependence on the measurements in real time. Any change to the decisive influence parameters thus immediately results in an adaptation or recalculation of the limit values that underly the slewing gear limitation in accordance with the disclosure and thus in a change in the control of the slewing gear.

Provision is made in a further possible embodiment that the instantaneous orientation of the crane relates to an instantaneous boom angle, an instantaneous tilt or listing of the crane, and/or an instantaneous slewing gear angle or slewing platform angle. With a more complex boom configuration, for example using a main boom and a luffing needle fastened thereto, a plurality of angles can also be measurable between the respective boom components to sense the total orientation. If the boom is a telescopic boom, the telescopic state or the telescopic length in particular also belong to the detectable orientation. The angle or angles can be measurable via angle transmitters. In particular the instantaneous working radius results from the measured angles in combination with the known dimensions of the crane. The tilt or listing can be measurable via one or more electrical tilt transducers.

In a further possible embodiment, a simulation means is provided that is configured to calculate the maximum permitted torque and/or the parameter derived therefrom for the current rotational movement of the slewing gear using a physical simulation model of the crane or of at least one crane component while taking account of an instantaneous equipment state, an instantaneous orientation, and an instantaneously raised load of the crane. The simulation means can be provided in the control unit and be executable by the control unit or can be implemented/executed in a separate simulation unit having a processor and memory and connected to the control unit. The simulation unit can be located in the crane or outside the crane (e.g. via a cloud).

Provision is made in a further possible embodiment that the control unit is configured to calculate a maximum permitted hydraulic differential pressure and to automatically limit an angular acceleration and/or an angular speed of the slewing gear on its basis by a corresponding control or regulation of the limitation circuit, in particular by a corresponding electric control of a limit pressure adjustment valve of the limitation circuit. The differential pressure is in particular the pressure difference between the control lines of the drive or motor responsible for a right hand movement and a left hand movement.

Provision is made in a further possible embodiment that the brake circuit comprises a first hydraulic store and a brake valve, wherein the holding brake, in particular a pressure chamber of the holding brake, can be connected to a control pressure line in a first position of the brake valve and to a hydraulic tank or a tank line or to the first hydraulic store in a second position of the brake valve. The brake valve may be electrically controllable and is in the currentless state, in particular in the second position. The control pressure is in particular a comparatively small pressure level introduced into a control pressure line to control certain functions. The control pressure can simultaneously contact a valve of the limitation circuit. The first hydraulic store can be charged with control pressure via a check valve. The brake valve can be a binary directional control valve.

Provision is made in a further possible embodiment that the brake circuit comprises a switchover valve via which the brake valve is connectable to the tank or to the first hydraulic store in the second position, with the switchover valve may be hydraulically controllable via a control connector. The switchover valve may be a binary directional control valve. In the non-controlled state, it may connect the brake valve to the tank, with the brake valve in particular connecting the holding brake to the switchover valve in the non-controlled state. On a lack of control of the brake and switchover valves, the holding brake may therefore be relieved toward the tank and therefore collapses.

Provision is made in a further possible embodiment that the control connector of the switchover valve is connectable to the tank. or to a tank line, or to a high pressure line of the limitation circuit via a first safety valve of the brake circuit. The maximum brake pressures of the control lines can be always present in the high pressure line. The first safety valve can be electronically controllable. Alternatively, it can be hydraulically controllable via a signal line that can be pressurized on an actuation of the slewing gear ("slewing gear on"). The first safety valve may be connected in a non-controlled state (control current or control pressure below the set control threshold of the valve) such that the control connector of the switchover valve is connected to the high pressure line. The first safety valve may be electrically or hydraulically switchable together with the second safety valve of the limitation circuit.

Provision is made in a further possible embodiment that the brake circuit is configured to automatically switch the brake valve into the second position and to connect it to the first hydraulic store on a failure of the control unit (due to a failure of the power supply, for example) and/or on a triggering of an emergency step of the slewing gear. The first hydraulic store may be connected to the tank via a restrictor unit in this state so that the first hydraulic store discharges slowly. The holding brake is thereby initially held open on a failure of the control unit or on an emergency shutdown via the pressure level present in the hydraulic store (that in particular corresponds to the control pressure level directly before the failure/emergency shutdown). If the pressure level in the store falls below a minimal brake opening pressure, the holding brake collapses. The slewing gear therefore initially remains regulated and limited on a loss of the power supply or on an emergency shutdown.

Provision is made in a further possible embodiment that the limitation circuit comprises two hydraulic control lines respectively effecting a left hand or right hand rotation of the slewing gear and a hydraulic pressure limitation apparatus, with the latter being configured to hydraulically conductively connect the control lines to one another (so that the oil from the line with a higher pressure flows into the line with a lower pressure) when the pressure difference in the control lines exceeds a limit pressure in dependence on the determined maximum permitted torque. The motor controlled via the control lines and thus the slewing gear movement is thus limited.

Provision is made in a further possible embodiment that the pressure limitation apparatus comprises at least one hydraulic pressure limitation valve via which the control lines are hydraulically conductively connectable to one another and that is hydraulically controllable or pre-controllable via a pre-control line, with the pre-control pressure present in the pre-control line being able to be determined via a hydraulic limit pressure circuit in dependence on the determined maximum permitted torque. The limit pressure circuit provides that the at least one pressure limitation valve opens when the pressure difference in the control lines exceeds a specific limit value or limit pressure that is dependent on the permitted torque determined by the control unit or on the permitted angular acceleration. One pressure limitation valve may be provided per control line.

Provision is made in a further possible embodiment that the limit pressure circuit comprises a differential pressure valve that is configured to connect the pre-control line to a tank on an exceeding of the limit pressure by the pressure difference in the control lines, wherein the difference pressure valve may be hydraulically controllable via a limit pressure line. The differential pressure valve can be a deadweight gauge that opens when the pressure applied at a high pressure connector exceeds the sum of a limit pressure applied at a differential pressure connector and a low pressure applied at a low pressure connector. In this case, the differential pressure valve is therefore in particular controllable via the limit pressure line in that the limit pressure defines the pressure difference between the other connectors at which the differential pressure valve switches or opens.

The maximum operating pressure present in the control lines may be supplied to the high pressure connector and the minimum operating pressure present in the control lines may be supplied to the low pressure connector, optionally reduced by a defined factor via one or more restrictors.

Depending on the direction of rotation of the slewing gear, the pressure in one of the two control lines is higher and forms the "high pressure" in the high pressure line that extends to the high pressure connector of the differential pressure valve. The pressure of the other line forms the low pressure. That pressure difference between the control lines can thereby be set by selecting the limit pressure from which the at least one pressure limitation valve opens and the slewing gear limitation begins.

Provision is made in a further possible embodiment that the limit pressure circuit comprises a second hydraulic store that is connected to the limit pressure line and that is connectable to a control pressure line via a second safety valve of the limit pressure circuit. The control pressure line may be likewise connected to the brake pressure valve and, via a check valve, to the first hydraulic store. The second safety valve can be electrically controllable. Alternatively, it can be hydraulically controllable via a signal line that can be pressurized on an actuation of the slewing gear ("slewing gear on"). The signal line can simultaneously actuate/control the first safety valve. The second safety valve may be electrically or hydraulically switchable together with a first safety valve of the brake circuit.

Provision is made in a further possible embodiment that the limit pressure circuit comprises a limit pressure setting valve that is controllable by the control unit and by means of which the limit pressure line is connectable to a control pressure line (in particular to the above-described control pressure line) and the limit pressure can be set in dependence on the determined maximum permitted torque. The limit pressure setting valve can have a falling characteristic so that the maximum limit pressure is set on the lack of a control (provided that a control pressure>zero is present in the control pressure line). The implementation of the load and geometry dependent slewing gear limitation in accordance with the disclosure therefore takes place via the limit pressure circuit and specifically via a corresponding setting of the limit pressure by the limit pressure setting valve.

Provision is made in a further possible embodiment that the limitation circuit is configured to automatically disconnect the second hydraulic store from the control line on a failure of the control unit and/or on a triggering of an emergency stop of the slewing gear so that the pressure of the second hydraulic store is present in the limit pressure line. The disconnection of the connection can take place by switching the second safety valve. The slewing gear limitation in accordance with the disclosure is thus also maintained on a failure of the power supply or control unit or on an emergency shutdown.

Provision is made in a further possible embodiment that the high pressure line is connected to the control lines via a valve arrangement such that the higher pressure of the control lines is always present in it, wherein the valve arrangement may comprise two valves, in particular check valves, via which a respective one of the control lines is connected to the high pressure line. Analogously, the low pressure line can be connected to the control lines via valves, in particular check valves, such that its pressure level ("low pressure") is always limited to the minimum of the pressures in the control lines.

Provision is made in a further possible embodiment that an emergency shutdown function or emergency stop function is provided that is automatically triggerable by the control unit by the crane operator and/or on the presence of an emergency stop triggering state, with the power supply being automatically able to be switched off and/or with the slewing gear being able to be automatically brakable while maintaining the slewing gear limitation as a consequence of the triggering of the emergency stop function. An abrupt braking can thereby be avoided that can result in an occurrence of unpermittedly high accelerations.

The present disclosure further relates to a crane having a slewing gear and an apparatus in accordance with the disclosure for controlling the slewing gear. The slewing gear can comprise one or more slewing gear motors that can be limited or controlled via the apparatus in accordance with the disclosure. In this respect, the same aspects and properties obviously result as for the apparatus in accordance with the disclosure so that a repeat description will be dispensed with at this point. The crane can be a crawler crane.

The present disclosure further relates to a method of controlling a crane slewing gear by means of the apparatus in accordance with the disclosure having the following steps:

- sensing an instantaneous load taken up by the crane;
- sensing an instantaneous orientation of the crane and/or of a crane component;
- determining a maximum permitted torque and/or a parameter derived therefrom for a current rotational movement of the slewing gear in dependence on at least the sensed load and the sensed orientation;
- controlling or regulating a drive motor of the slewing gear such that the angular acceleration and/or the angular speed of the slewing gear is/are limited to a parameter dependent on the maximum permitted torque; and
- on a failure of the control unit or on the triggering of an emergency stop, automatically braking the slewing gear so that the maximum permitted angular acceleration and/or angular speed of the slewing gear is/are not exceeded.

In this respect, the same aspects and properties obviously result as for the apparatus in accordance with the disclosure so that a repeat description will be dispensed with at this point.

BRIEF DESCRIPTION OF THE FIGURES

Further features and details of the disclosure result from the embodiments explained in the following with reference to the Figures. There are shown.

DETAILED DESCRIPTION

Figure 1:
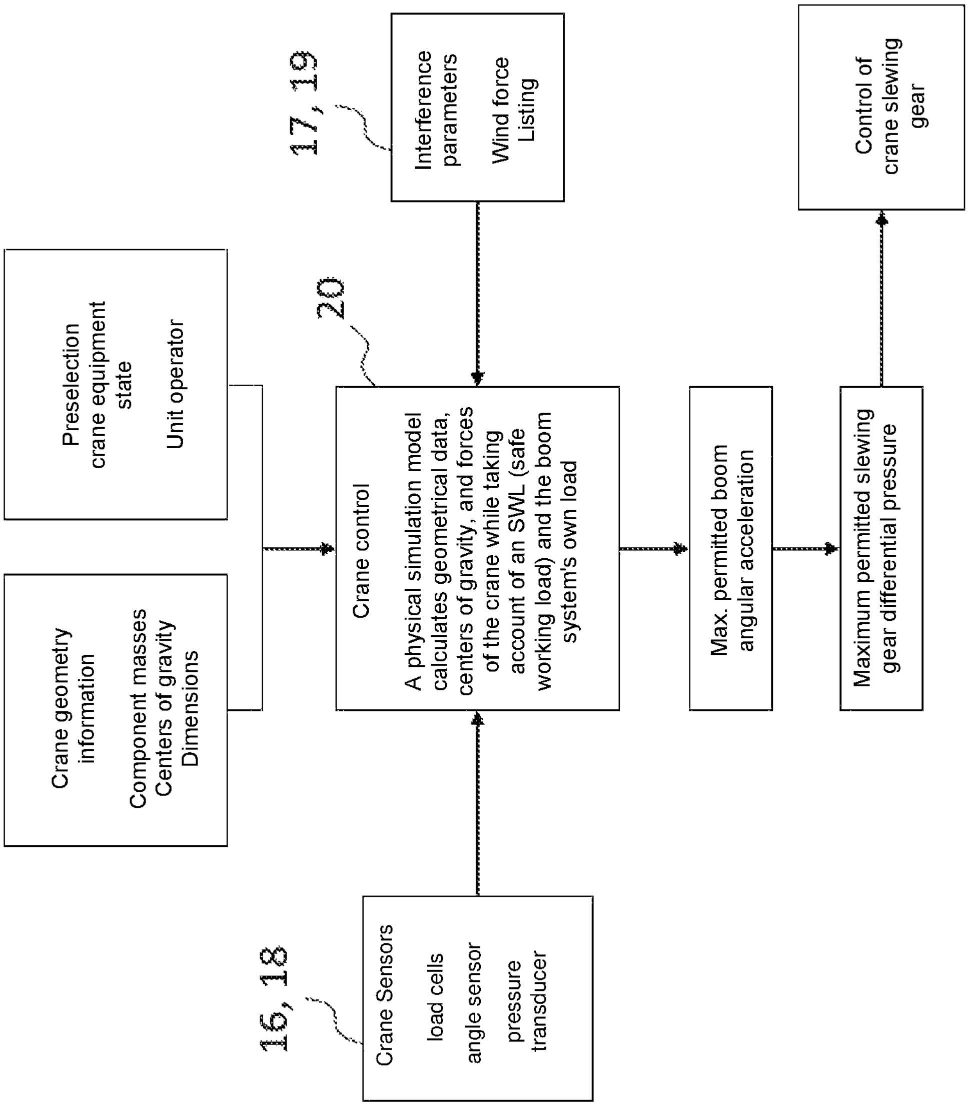
FIG. 1: a schematic representation of the apparatus in accordance with the disclosure for controlling the crane slewing gear in accordance with an embodiment.

FIG. 1 shows the components and influence factors of the apparatus in accordance with the disclosure or of the method in accordance with the disclosure for controlling a slewing gear 10 of a crane 1 in a block diagram. The calculation of the permitted torque or of the permitted angular acceleration for the slewing gear movement takes place in a control unit 20 which is the CPU of the crane control in the embodiments looked at here.

Figure 2:
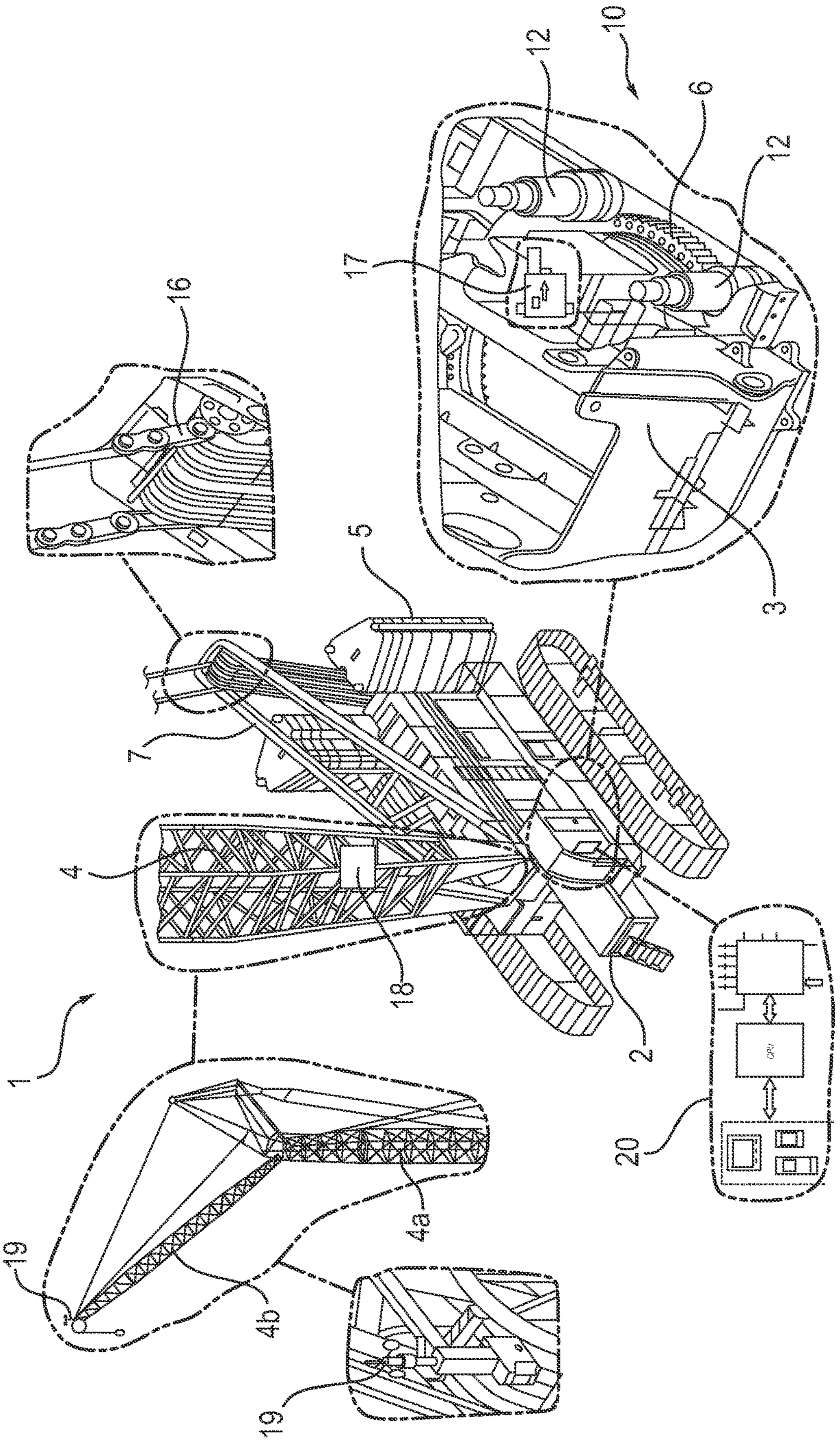
FIG. 2: different views of a crane with a slewing gear controlled via the apparatus in accordance with the disclosure in accordance with an embodiment, with different elements of the apparatus in accordance with the disclosure and their arrangement being shown.

A crawler crane 1 that is shown in FIG. 2 is looked at in the following embodiment. The crawler crane 1 comprises an undercarriage 12 having crawler chassis and a superstructure 3 supported on the undercarriage 12 rotatable via a slewing gear 10 about a vertical axis. The superstructure 3 has a boom 4 that is pivotably supported about a horizontal axis and that, in the embodiment looked at here, comprises a main boom 4*a* and a luffing needle 4*a* that are guyed via guying constructions. The superstructure 3 has a superstructure or rear ballast 5 at the rear having two lateral stacks of a plurality of ballast plates. The guying of the main boom 4*a* takes place via a guying frame 7 pivotably supported at the superstructure 3 about a horizontal axis.

In FIG. 2, details of different components of the crane 1 are shown with elements of the apparatus in accordance with the disclosure such as crane sensors or slewing gear components. The slewing gear 10 can thus be seen at the bottom right that comprises a large roller bearing 6 and a plurality of motors 12 driving the large roller bearing 6 via pinions. An anemometer 19 for determining the instantaneous wind force is located at the tip of the luffing needle.

Figure 3:
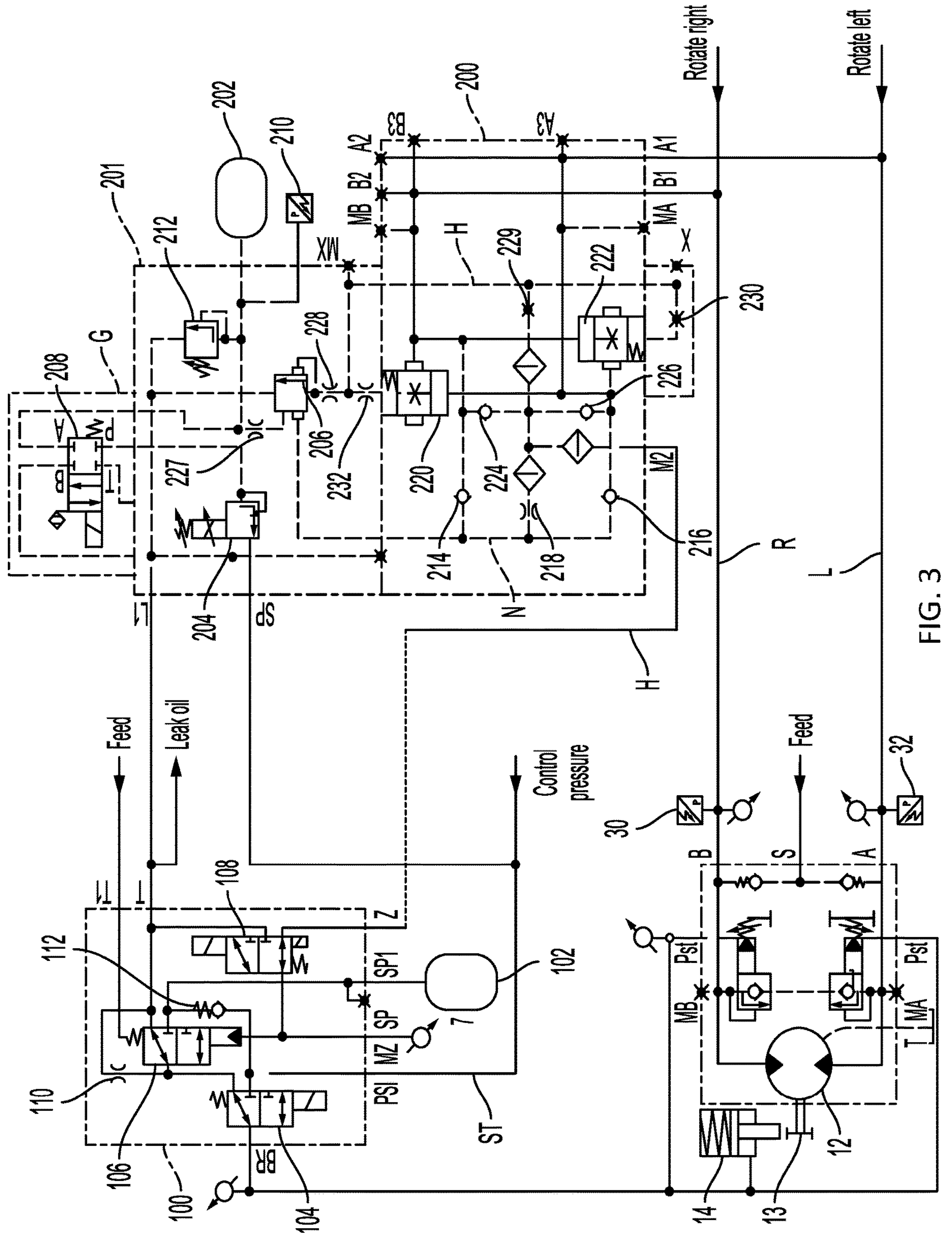
FIG. 3: a circuit diagram of the hydraulic system used to control the slewing gear motor in accordance with an embodiment, wherein hydraulic symbols are used to represent various components.

The control of the crane slewing gear 10 takes place hydraulically, with an embodiment of the hydraulic system being shown in FIG. 3 and being described further below. For reasons of simplicity, only a slewing gear motor 12 is shown in FIG. 3.

1. Overview

Depending on the crane configuration and the payload, an improper operation of the slewing gear in operation or an actuation of the emergency shutdown can lead to unpermittedly high transverse forces with crawler cranes. On an emergency stop of stop category 0 or on a failure of the machine, an immediate interruption of the energy supply to the drive element or elements and thus the collapse of the holding brake(s) of the slewing gear takes place. A category 0 stop requires stopping by immediate removal of power to the machine actuators (i.e. an uncontrolled stop—stopping of machine motion by removing electrical power to the machine actuators). This produces a significantly higher load on the boom bearing structure. Without countermeasures, these circumstances result in significantly higher moments of inertias and further consequently in significantly higher loads on the boom bearing structure.

In accordance with the disclosure, a load and geometry dependent slewing gear torque limitation (also simply called a slewing gear limitation in the following) is selected as the solution approach. The starting value here is the maximum permitted angular acceleration of the superstructure 3 with the existing utilization of the maximum structure payload. A maximum permitted torque or a maximum permitted pressure in the slewing gear 10 is calculated therefrom corresponding to the crane configuration, the current load, and the current angular positions. The slewing gear pressure is limited to this maximum permitted pressure by the apparatus in accordance with the disclosure.

Since a constant deceleration time is to be ensured, the crane rotation speed is likewise limited. The slewing gear limitation also engages on an emergency stop or on a failure of the crane control 20. The maximum permitted pressure in the slewing gear 10 is in these cases also still limited to the last permitted value by at least one hydraulic store and the holding brake 14 is held open up to the standstill of the rotational movement, but for a maximum of some seconds.

The slewing gear torque limitation is in particular permanently active provided it is not switched off via a correction value in the valid payload table range.

The determination of the permitted angular acceleration is defined via the starting equation:

$$(\Sigma I(AL)_x+I(OW)+I(WL))\cdot\alpha_{zul}\leq M(FQ[\%])-M(W)-M(K)\ldots$$

$\Sigma I(AL)_x$ here stands for the sum of the inertial moments I(AL) of the different boom parts, i.e. the total moment of inertia of the boom 4; I(OW) for the moment of inertia of the superstructure 3; I(WL) for the moment of inertia of the working load; $\alpha_{zul}$ for the maximum permitted angular acceleration; M(FQ[%]) for the torque resulting from the maximum permitted transverse force; M(W) for the torque resulting from the instantaneous wind force; and M(K) for the torque resulting from the instantaneous listing or slanted position of the crane 1.

The following influence parameters are supplied to the CPU or control unit 20, that is to the physical simulation model executed thereby, for this purpose.

a) Influences from Geometry Data

The geometry information includes all the relevant component masses, center of gravity coordinates, and dimensions of the total machine. They are supplied to the physical simulation model by the preselection of the unit equipment state required for the safe crane operation.

b) Influences from the Crane Sensor System

The influence parameters from the current working load and of the current working radius are sensed via the force measurement tabs 16, angle transmitters 18, and pressure transducers and are likewise supplied to the physical simulation model. In this respect, the working load is understood as the total load resulting from the hoist ropes, lower blocks, attachment means, suspension gear, and the payload to be manipulated.

c) Influences from Interference Parameters

Those parameters are called interference parameters that can act on the crane system additionally from the outside, substantially uninfluenceably. They are in particular the listing or slanted position of the machine and the wind force. The wind speed is sensed by means of wind gauges 19, the listing by means of at least one electrical tilt transducer 17 and is likewise supplied to the physical simulation model.

The physical simulation model calculates the maximum permitted boom angular accelerations, that are in turn converted into the maximum permitted slewing gear differential pressures and are used for controlling the crane slewing gear 10 in real time while taking account of all the influences from a)-c).

All the changes of the influence parameters, individually or in any superposition, as stated under a)-c), immediately lead to changes of the control of the slewing gear 10. In this respect, the change of the control of the slewing gear 10 is always determined and limited from the calculated permitted angular boom acceleration $\alpha_{zul}$.

The hydraulic braking system is combined with the load and geometry dependent slewing gear limitation for the ensuring of the permitted brake acceleration even on an abrupt loss of the energy supply such as in the event of the actuation of an emergency stop button or other events that result in an abrupt loss of the energy supply.

A specific example: for the implementation of the load and geometry dependent slewing gear limitation will be described in the following.

2. Calculation Algorithm

The same approaches as in the acceleration or deceleration in proper crane operation also apply in principle on a deceleration due to an emergency stop or a machine failure. The same determined limitations thus apply. All the required calculation values for the following starting equation are already present as existing parameters either in the GEO files, in the structural data, or in the software.

3. Determining the Moment of Inertia of the Base Unit

The base unit is loaded in 3D CAD software and measured in the standard state (superstructure 3, winches, standard equipment, etc.). In the "superstructure" GEO file, the mass moment of inertia is also included as a constant in the z axis of the total superstructure including the winches. The rear ballast 5 and the A frame 7 are not considered in the superstructure model and are calculated separately (e.g. partial ballasting). The total moment of inertia $J_{gesamt}$ [$kgm^2$] is calculated from:

$$J_{gesamt}=J_{OW}+J_{AB}+J_{HB}+J_D+J_{DB}.$$

Here, $J_{OW}$ stands for the mass moment of inertia of the superstructure 3 (GEO file specification); $J_{AB}$ for the mass moment of inertia of the guying frame or of the A frame 7; $J_{HB}$ for the mass moment of inertia of the rear ballast 5 (e.g. calculated from the masse of the rear ballast 6 multiplied by the radius of the center of gravity to the rotation center); $J_D$ for the mass moment of inertia of the derrick boom (if such a one is attached); and $J_{DB}$ for the mass moment of inertia of the derrick ballast (is such a one is used).

4. Calculating the Permitted Angular Acceleration

The permitted angular acceleration $\alpha_{zul}$ is calculated on the existing utilization of the maximum structural payload as a special load case without wind and listing since these permitted forces can only occur on an emergency stop or outside standard operation. The permitted angular acceleration $\alpha_{zul}$ is output as a curve (over a plurality of sampling points) in dependence on the utilization of the maximum structural payload.

5. Calculating the Mass Moments of Inertia

The mass moments of inertia from boom segments and working loads are calculated as follows:

$$J_{AL}=\Sigma(m(AL)_x\cdot r(AL)_x^2),$$

$$J_{WL}=\Sigma(m(WL)_x\cdot r(WL)_x^2),$$

where $J_{AL}$ [$kgm^2$] stands for the mass moment of inertia of the boom system; $m(AL)_x$ [kg] for the mass of a single boom element (e.g. articulated connection point, intermediate point, head, etc.); $r(AL)_x$ [m] for the center of gravity distance of the respective boom piece from the rotation center; $J_{WL}$ [$kgm^2$] for the mass moment of inertia of the working loads; $m(WL)_x$ [kg] for the mass of a single working load (WL); and $r(AL)_x$ [M] for the working radius of the respective working load.

6. Calculating the Permitted Slewing Gear Pressure

The pressure difference for the control of the slewing gear can be calculated from the data of the installed slewing gear motor or motors 12, the motor equipment, the number of motors 12, the known moments of inertia, the limit torque of the boom 4, and the frictional losses. If a fixedly specified maximum angular acceleration $\alpha_{max}$ is defined for the crane 1, the maximum permitted angular acceleration for the crane 1 in the current configuration and orientation is the smaller value of $\alpha_{zul}$ and $\alpha_{max}$. The value for $\alpha_{max}$ is stored in the crane control or in a memory or is stored in a file uploaded at the start of operation. For reasons of simplicity, it is only stated in the following that the respective value is stored "in the crane control".

The previously looked at total mass moment of inertia $J_{gesamt}$ multiplied by the permitted angular acceleration $\alpha_{zul}$ produces the torque at the slewing gear $M_{DM}$ that is defined via constant values and via the pressure difference:

$$M_{DW}=J_{gesamt}\cdot\alpha_{zul}$$

or $$M_{DW} = M_{mot}\cdot(\Delta p_{zul}+\Delta p_{reib})\cdot f\cdot i\cdot\frac{Z(R)}{Z(G)}.$$

The maximum permitted pressure difference $\Delta p_{zul}$ for the control of the slewing gear motor 12 results from this as $$\Delta p_{zul} = \frac{J_{gesamt}\cdot\alpha_{zul}}{f\cdot i\cdot M_{mot}}\cdot\frac{Z(R)}{Z(G)}-\Delta p_{reib},$$

where $\Delta p_{reib}$ [bar] is the crane type dependent pressure loss due to friction (e.g. determined by experimentation); $\alpha_{zul}$ [1/s] is the maximum permitted angular acceleration calculated by the physical simulation model; f is the number of slewing gear motors 12; i is the transmission ratio of the slewing gear; Z(R) is the number of teeth of the pinion driving the large roller bearing 6; Z(G) is the number of teeth of the large roller bearing 6; $M_{mot}$ [Nm/bar] is the motor-specific torque; and $J_{gesamt}$ [$kgm^2$] is the total mass moment of inertia of the crane 1 together with the load.

7. Determining of $\Delta p_{reib}$ by Experimentation

The friction loss $\Delta p_{reib}$ at maximum speeds of the individual slewing gear stages is determined using experiments at the test bench. They are type independent and therefore variable. The loss pressure is necessary to maintain a constant speed and is measured at the slewing gear motor 12 in that the crane 1 is rotated at a constant rotational speed in the second stage. The measured loss pressure corresponds to the friction losses in slewing gear stage 2. For practical reasons, a fixed value for $\Delta p_{reib}$ can also be deducted here.

8. Limitation to $\Delta p_{max}$

The previously determined maximum differential pressure of the hydraulic system $\Delta p_{zul}$ is restricted to a fixed $\Delta p_{max}$ [bar} that is stored in the crane control. This ensures that the crane 1 cannot achieve any speed that cannot be decelerated within an integration time set at the crane 1. The maximum differential pressure in the open hydraulic system corresponds to the maximum absolute pressure. The maximum differential pressure in the closed system in contrast corresponds to the difference from the maximum absolute pressure and the feed pressure.

9. Observation of the Minimum Differential Pressure $\Delta p_{min}$

The required minimum differential pressure $\Delta p_{min}$ the hydraulic system is induced by the system and is stored in the crane control. If the calculated maximum permitted differential pressure $\Delta p_{zul}$ is smaller than $\Delta p_{min}$, the calculated value has to be set to $\Delta p_{min}$. It may be, however, ensured beforehand that there are no crane configurations for which $\Delta p_{zul}$ is below $\Delta p_{min}$ (e.g. 80 bar).

10. Determining the Maximum Permitted Rotational Crane Speed

The permitted rotational crane speed can be determined from the now present permitted angular acceleration $\alpha_{zul}$ to safely come to a standstill in the given integration time. The minimum integration time $t_{min}$ is stored in the crane control and can amount to some seconds. The achievable boom head speed in dependence on the permitted angular acceleration $\alpha_{zul}$ is described by the following equation or the following algorithm:

| | |
|---|---|
| if | $\Delta p_{zul} \leq \Delta p_{max}$ |
| then | $v(K) = r \cdot \alpha_{zul} \cdot t \cdot 60$ |
| | $\Delta p_{zul} = \Delta p_{zul}$ |
| else | $v(K) = r \cdot \alpha_{zul} \cdot t \cdot 60 \cdot \frac{\Delta p_{max} + \Delta p_{reib}}{\Delta p_{zul} + \Delta p_{reib}}$ |
| | $\Delta p_{zul} = \Delta p_{max}$. |

Here, v(K) [m/min] stands for the boom head speed without limit for a permitted maximum speed; t [s] for the integration time from the slewing gear slider (set at the unit); $t_{min}$ [s] for the minimum settable integration time at the unit ($t \geq t_{min}$); and r [m] for the working radius of the working load; and $F_Q$ as the permitted transverse force. Too high a $\alpha_{zul}$ is standardized to an angular acceleration $\propto$ achievable by $\Delta p_{max}$ by the term $(\Delta p_{max}+\Delta p_{reib})/(\Delta p_{zul}+\Delta p_{reib})$. It can thereby be ensured that the unit can be brought to a standstill by the maximum possible pressure difference $\Delta p_{max}$ within the integration time t. The factor 60 serves the conversion into m/min.

On passenger transportation and/or on a derrick operation, v(K) can additionally be limited to a specific maximum value, for example to 30 m/min. In derrick operation, the rotational crane speed can likewise be limited to a maximum value, for example to 0.2 r.p.m. This can be done in accordance with the following algorithm:

| | |
|---|---|
| if | |
| | $v(K) > v_{max,Kopf}$ |
| or | |
| | $v(K) > v_{max,Pers}$ |
| then | |
| | $v(K) = v_{max,Kopf}$ |
| or | |
| | $v(K) = v_{max,Pers}$ |
| else | |
| | $v(K) = v(K)$, |

where $v_{max,Kopf}$ [m/min] stands for the maximum permitted head speed independently of the working radius and $v_{max,Pers}$ [m/min] for the maximum permitted head speed independently of the working radius in passenger transportation.

The rotational crane speed resulting from this follows the equation $$n_{zul} = \frac{v(K)}{2 \cdot \pi \cdot r_{max}},$$

where $n_{zul}$ [1/ min] is the rotational crane speed in dependence on the maximum permitted angular acceleration $\propto_{zul}$; and $r_{max}$ is the radis of the furthest distant head.

There results with $DWB_{max,Umdrehung}$ [1/ min] as the maximum permitted rotational speed per mode (that can be stored in the crane control:

| | |
|---|---|
| if | |
| | $n_{zul} > DWB_{max,Umdrehung}$ |
| then | |
| | $n_{zul} = DWB_{max,Umdrehung}$ |
| else | |
| | $n_{zul} = n_{zul}$. |

11. Implementation of the Slewing Gear Limitation in Derrick Operation

The slewing gear limitation is not active in derrick operation. In derrick operation, the head speed is reduced to 30 m/min and the maximum revolution speed to 0.2 r.p.m.

12. Slewing Gear Limitation with Floats

In operation on floats or "floating units" (e.g. ship crane), it is assumed that the tilt is caused by the load at the crane 10. If the boom 4 of the crane 1 is not in the axis of symmetry of the float, a lateral tilt also results in addition to the tilt in the boom direction. This state results in a tilt torque increase that is correctly sensed via corresponding sensors and is taken into account. The rear ballast 5 becomes the influence parameter to be driven or to be braked in operation when looked at in this manner Small lateral tilts (<1%) can be neglected as a rule.

13. Validity Range

The load and geometry dependent slewing gear torque limitation can be provided, for example, for all operating modes without derricks and can be able to be switched off via a correction value.

14. Taking Account of Wind

When looking at the wind, only the driving influence or the braking influence can be observed separately The wind changing abruptly, that is without any time delay, from driving to braking, can be excluded as a rule. If the wind acts as driving, the delay time increases, but the load on the boom 4 remains unchanged since the permitted pressure remains unchanged. If the wind acts as braking, the delay time decreases, but the load on the boom 4 remains unchanged since the permitted pressure remains unchanged.

15. Influence of a Swaying of the Load on the Structure

In the intended crane operation, the swaying of the load is controlled and minimized by the crane operator. Since the load and geometry dependent slewing gear torque limitation is not a driver assistance system, but rather has to satisfy the function of simply "boom protection", only the emergency stop load case enters into the observation.

16. Standardizing Control Lever

A dead run arises on a master switch control on a limitation of the rotational speed. The reason for this is that the maximum permitted rotational speed depends on the current geometrical position and on the measured values of the unit. This value therefore changes constantly during operation. The standardizing of the master switch may, however, not be influenced since the unit is otherwise no longer drivable.

17. Hydraulic System

A circuit diagram of an embodiment of the hydraulic system of the crane 1 for driving the slewing gear 10 or for controlling the motor 12 is shown in FIG. 3.

The slewing gear 10 is controlled via a hydraulic motor 12 that rotationally drives a shaft 13. A plurality of such motors 12 can naturally also be provided as slewing gear drives. The two pressure or control lines R and L for the hydraulic drive of the motor 12 are supplied with hydraulic oil from an energy source not shown here. The control line R is acted on by a corresponding operating pressure for a right hand rotation of the slewing gear 10 and the control line L is acted on by a corresponding operating pressure for a left hand rotation. On an actuation of the slewing gear 10, one of the two control lines R, L always has a higher pressure level than the other. A pressure sensor 30, 32 is connected to every control line R, L.

The hydraulic system has a brake circuit 100, a limitation circuit 200, and a limit pressure or differential pressure circuit 201 (the latter can also be considered part of the limitation circuit 200). The brake circuit 100 can be accommodated in its own brake block. The limitation circuit 200 can equally be accommodated in its own limitation block and/or the limit pressure circuit 201 can be accommodated in its own limit pressure block or differential pressure block. The lines opening into a hydraulic tank are called tank lines T in the following. For reasons of simplicity, the tank itself is also provided with the reference symbol T.

Pre-controlled secondary pressure limitation valves 220, 222 are installed between the two control lines R. L of the drive 12 such that they conduct oil from the high pressure side to the low pressure side on a response.

The current operating pressure is taken from the higher pressure side of the control lines R and L having the signal "high pressure" via the check valves 224, 226 and is supplied to the differential pressure control. Different pressures can be present in the high pressure line H that is provided with reference symbol H in FIG. 3 since restrictors are arranged at different positions. A signal or pressure level is generated via the restrictor 218 from "high pressure" and is supplied via the check valves 214 and 216 to "low pressure", i.e. is limited to the smaller of the pressure levels present in the control lines R, L. "High pressure" therefore indicates the maximum and "low pressure" indicates the minimum of the operating pressures "to the right and left" of the slewing gear 10 independently of the direction of rotation of the slewing gear 10.

The current operating pressure ("high pressure") is converted into a pre-control pressure via the restrictors 228 and 229 and the differential pressure valve 206 designed as a deadweight gauge in this embodiment. This pre-control pressure acts on the pressure limitation valves 230 and 232 as a pre-control via the restrictors 220 and 222.

The signal "high pressure" (i.e. the pressure present in the high pressure line H after the restrictor 228) acts on the high pressure side of the deadweight gauge 206 to open it. The signal "low pressure" (i.e. the pressure present in the low pressure line N) acts on the low pressure side of the deadweight gauge 206 to close it, assisted by a "pressure difference signal! of the pressure control that results via the pressure present in the limit pressure line G (limit pressure).

The deadweight gauge 206 opens when the signal "high pressure" exceeds the value formed from "low pressure" and "pressure difference signal". In this case, the pre-control pressure (i.e. the pressure present after the restrictors 230 and 232) is led off into the tank and the pressure setting of the secondary pressure limitations 220, 222 are thus controlled or changed.

The control of the differential pressure takes place via an electrically controllable proportional limit pressure setting valve 204 that is designed as a pressure reducing valve here. A control pressure is applied to the limit pressure setting valve 204 that defines the maximum differential pressure between the control lines R, L. The control pressure is converted by the limit pressure setting valve 204 into the limit pressure applied to the deadweight gauge 206. In this respect, the limit pressure setting valve 204 has a falling characteristic so that the maximum control pressure is present in the currentless state, i.e. the maximum possible limit pressure is present.

The limit pressure setting valve 204 is electrically controlled directly or indirectly by the control unit 20. The maximum permitted torque determined via the physical simulation model or the permitted angular acceleration $\propto_{zul}$ and the maximum permitted pressure difference $\Delta p_{zul}$ derived therefrom is converted into a corresponding control of the differential pressure or limit pressure applied to the deadweigth gauge 206. The setting of the limit pressure in the limit pressure line G by the valve 204 therefore decides the pressure difference in the control lines R and L from which onward the pressure limiting valves 220, 222 open and oil flows from the high pressure side to the low pressure side.

The deadweight gauge 206 has a specific transmission ratio i that can, for example, be at i=12.7. A pressure signal at a control pressure of 0-30 bar thereby e.g. corresponds to a pressure securing to an operating pressure level of 0-380 bar.

A second safety valve 208, a pressure limitation valve 212 used for the maximum pressure setting of the limit pressure, and a second hydraulic store 202 are inserted into the limit pressure line G. On an exceeding of a maximum value for the pressure control, the pressure limitation valve 212 switches and relieves the limit pressure line G toward the tank T. To measure the current value of the pressure control, a pressure measurement device 210 is provided that measures the limit pressure present in the limit pressure line G and can be configured as an analog pressure sensor.

The second safety valve 208 is a digital, i.e. binary, directional poppet valve (only two switch positions). It is electrically controlled in the embodiment shown in FIG. 3.

The brake circuit 100 (or brake block) comprises an electrically controllable digital brake valve 104, an electrically controlled digital safety valve, and a hydraulically controlled digital switchover valve 106. The brake circuit 100 or the brake block further comprises a first hydraulic store 102 that can be acted on or charged with control pressure from the control line ST via a check valve 112.

The outlet of the brake valve 104 formed as a 3/2 way valve in the present embodiment is connected to a pressure chamber of the holding brake 14. The holding brake 14 is released against the force applied by a compression spring by a pressurization (opening pressure) so that the shaft 13 can rotate freely. If the hydraulic pressure in the pressure chamber falls below a certain value (minimum brake opening pressure), the holding pressure 14 engages and exerts a braking torque on the shaft 13 or the motor 12. The position of the brake valve 104 therefore defines whether the holding brake 14 of the slewing gear 10 remains open (first position of the brake valve 104; takes place on a corresponding electric control) or whether the collapse of the holding brake 14 should be initiated (second position of the brake valve 104; no electric control or current=0).

The position of the switching valve 106 defines whether the outflow line of the brake line 104 is connected to the tank or to the tank line T or to store pressure from the first hydraulic store 102. When pressurized (first position of the brake valve 104), there is a connection to the first hydraulic store 102 (and thus control pressure); when pressure relieved (second position of the brake valve, shown in FIG. 3), there is a connection to the tank T.

The first safety valve 108 is a digital, i.e. binary, directional poppet valve (only two switch positions). It is electrically controlled and configured as a 3/2 way valve in the embodiment shown in FIG. 3.

The position of the first safety valve 108 defines whether the hydraulic control of the switchover valve 106 is acted on by the current operating pressure ("high pressure") of the slewing gear 10 (in accordance with the switch position shown in FIG. 3: the control connector of the switchover valve 106 is connected to the high pressure line H of the limitation circuit 200) or the control connector is tank relieved.

The first and second safety valves 108, 208 can be controlled via a common electrical signal. Alternatively, the previously addressed hydraulic control can take place via a hydraulic signal "slewing gear on". In this respect, the safety valves 108, 208 may be switched as soon as the signal "slewing gear on" adopts a specific value, for example a value greater than 5 bar.

The safety valves 108, 208 define whether the operational control of the holding brake 14 and the differential pressure valve 206 is active (with an electric control: power=1; with a hydraulic control: e.g. pressure signal>5 bar) or whether the control takes place via the control pressures in the first and second hydraulic stores 102 and 202 (with an electric control: power=0; with a hydraulic control, e.g. pressure signal<5 bar).

It must be noted at this point that in simplified terms a control of "power=1" is spoken of with respect to the electric control of the valves with an effective control of "power=1" (i.e. the electric signal is sufficient to switch the valve) and control of "power=0" is spoken of with a lack of a control (or with a control insufficient for the switching of the valve). A control power larger than zero, but not sufficient for a switching, is likewise called "power=0"

In the energyless state (diesel engine of the crane 1 off, all valves not actuated), the system is pressureless. A possibly occurring thermal expansion of the enclosed oil volume is degraded via leaks of the participating valves. The holding brake 14 of the slewing gear 10 is closed. The pressure engaging stages of the slewing gear motor 12 is at a low pressure stage. If the holding brake 14 is overcome by external forces, the hydraulic motor 12 conveys oil in accordance with the direction of rotation of the drive against the resistance of the secondary pressure limitation (valves 220, 222). The operating pressures occurring here are not sufficient, due to the pressure relief of the pre-control of the pressure limitation valves 220, 222, to change something about the switch state of the system.

The system is acted on by control pressure on the switching on of the diesel engine of the crane 1 (i.e. there is a control pressure>zero in the control pressure line ST). The first hydraulic store 102 at the brake block is charged with control pressure from the line St via the check valve 112. The control pressure is applied to the brake valve 104 and to the limit pressure setting valve 204. Due to its inverse characteristic, the limit pressure setting valve 204 acts on the second safety valve 208 with control pressure.

The signal "high pressure" between the restrictors 228, 229, 230, and 232 climbs to the level of the feed (open hydraulic system: as a rule <5 bar: closed hydraulic system as a rule approximately 30-40 bar). To nevertheless hold the holding brake 14 closed, the switching threshold of the switchover valve 106 has to lie above the pressure level of the feed so that it is not switched. This switching threshold has the value of 5 bar in an embodiment to be able to switched by the signal "slewing gear on". For this reason, said embodiment can only be used for slewing gears 10 operated in an open circuit.

On the closing of the entry lever, the limit pressure setting valve 204 is adjusted to the value for the maximum permitted drive and brake torque specified by the software or by the control unit 20. Due to the construction, the limit pressure setting valve 204 delivers a minimum value for the pressure difference signal that cannot be fallen below on a full current feed, i.e. for the limit pressure in the line G. Due to the transmission ratio in the deadweight gauge 206, a minimum pressure securing of the slewing gear operating pressure of, for example, 80 bar results.

On an actuating of the master switch (state "slewing gear operation"), the slewing gear 10 behaves as described in the base function as long as the operating pressure is below the currently permitted maximum pressure in accordance with the limit pressure setting valve 204. The slewing gear drive 12 should not actively achieve the pressure level specified by the limit pressure setting valve due to a suitable control of the limit pressure setting valve 204. It is thus prevented that unnecessary thermal energy occurs.

On actuation of the command "rotate slewing gear" by the crane operator, the first and second safety valves 108, 208 are automatically actuated. The first safety valve 108 switches into the position in which the control connector of the switchover valve 106 is connected to the tank line T. The second safety valve 208 switches into the position in which the limit pressure setting valve 204 is connected to the deadweight gauge 205 so that a limit pressure generated from the control pressure corresponding to the electric control of the limit pressure setting valve 204 is present in the limit pressure line G. The limit pressure is thus not specified by the second hydraulic store 202, but rather via the control pressure and the limit pressure setting valve 204. The second hydraulic store 202 is charged to the current limit pressure and the secondary pressure limitations of the valves 220 and 222 are pre-controlled therewith.

If the currently valid maximum differential pressure or limit pressure is exceeded (e.g. by external forces due to side wind, slanted position, or a collision with obstacles), the differential pressure valve 205 opens so that oil flows from the pre-control chambers of the secondary pressure limitation valves 220, 222 into the tank T. The pre-control of the pressure limitation valves 220, 222 thereby falls a little. The operating pressure "right" or "left" (depending on the actuation of the slewing gear 10) opens the associated valve 220, 222 and oil flows from the high pressure side to the low pressure side of the slewing gear drive 12. A further increase of the differential pressure, i.e. of the pressure difference in the control lines R and L, is prevented.

On an actuation of the emergency stop during the slewing gear movement, all the electrical controls are switched off and the diesel engine is stopped. The brake valve 104, the limit pressure setting valve 204, and the first and second safety valves 108, 208 fall together, i.e. the actuation of the safety valves 108 208 is cancelled.

The rotational energy of the superstructure 3 with the boom 4 and the load and possible external forces drives the motor 12. An operating pressure that acts against the rotational movement is built up in the control lines R, L in dependence on the direction of rotation. Coming from the check valves 224, 226, this operating pressure actuates the switchover valve 106 since the first safety valve 108 is in the currentless position in the passage position (cf. FIG. 3). The last valid pre-control pressure on the valves 220, 222 is maintained by the second hydraulic store 202. The control pressure stored in the first hydraulic store 102 holds the holding brake 14 open via the valves 104 and 106. The superstructure 3 is decelerated by permitted torque.

The first hydraulic store or brake store 102 is gradually emptied via the restrictor 110 and the opening pressure in the holding brake 14 is thus reduced. The holding brake 14 closes on a falling below of the minimal brake opening pressure. If the signal "high pressure" in the line H falls below the actuation pressure of the switching valve 106 before the emptying of the first hydraulic store 102, the former drops and connects the holding brake 14 to the tank line T, which allows the holding brake 14 to collapse.

On an opening of the entry lever during the slewing gear movement, the control of the energy source and thus the conveying of oil into the control lines R, is first reversed in an integrating manner. The actuation of the safety valves 108, 208 is cancelled by a corresponding electrical control. The brake valve 104 is then switched currentless so that it adopts the second position (cf. FIG. 3).

The last value of the differential pressure control or of the limit pressure in the line G is initially maintained due to the second hydraulic store 202 and is gradually degraded via a leak at the differential pressure valve 206. As long as the operating pressure remains above the switching threshold of the switchover valve 106, the holding brake 14 remains open. With the exception of a diesel engine stop, the processes run that are described above with respect to the state "emergency stop actuated".

REFERENCE NUMERAL LIST

1 crane
2 undercarriage
3 superstructure
4 boom
4*a* main boom
4*b* luffing needle
5 rear ballast
6 large roller bearing
7 guying frame/A-frame
10 slewing gear
12 motor/slewing gear drive
13 shaft
14 holding brake
16 force measuring strap
17 tilt transducer
18 angle transmitter
19 anemometer
20 control unit
30 pressure sensor
32 pressure sensor
100 brake circuit
102 first hydraulic store
104 brake valve
106 switching valve
108 first safety valve
110 restrictor unit
112 check valve
200 limitation circuit
201 limit pressure circuit
202 second hydraulic store
204 limit pressure setting valve
206 differential pressure valve (deadweight gauge)
208 second safety valve
210 pressure measurement device
212 pressure limitation valve
214 check valve
216 check valve
218 restrictor
220 pressure limitation valve
222 pressure limitation valve
224 check valve
226 check valve
227 restrictor
228 restrictor
229 restrictor
230 restrictor
232 restrictor
G limit pressure line
H high pressure line
L control line for "rotate slewing gear to the left"
N low pressure line
R control line for "rotate slewing gear to the right"
ST control pressure line
T tank/tank line

The invention claimed is:

1. An apparatus for controlling a crane slewing gear comprising at least one hydraulic motor by means of which the slewing gear is rotationally drivable or brakable;

at least one holding brake by means of which the slewing gear is held stationary;

a hydraulic brake circuit by means of which the holding brake is hydraulically controllable;

a load sensing device by means of which a load instantaneously taken up by the crane is sensed; and an orientation sensing device by means of which an instantaneous orientation of the crane and/or of at least one crane component is sensed, wherein a hydraulic limitation circuit by means of which a hydraulic pressure applied to the motor is limited to a specific limit value; and a control unit that is connected to the limitation circuit and that is configured to determine a maximum permitted torque and/or a parameter derived therefrom for a current rotational movement of the slewing gear in dependence on at least the sensed load and the sensed orientation and to automatically limit an angular acceleration and/or angular speed of the slewing gear on this basis by a corresponding control or regulation of the limiting circuit, wherein the limitation and brake circuits are connected to one another and are configured to automatically brake the slewing gear while maintaining the slewing gear limitation on a failure of the control unit or on a triggering of an emergency stop.

2. The apparatus in accordance with claim 1, wherein the control unit is configured to take account of current geometry data of the crane for the determination of the maximum permitted torque and/or the parameter derived therefrom.

3. The apparatus in accordance with claim 1, wherein the control unit is configured to take account of current environmental data for the determination of the maximum permitted torque and/or of the parameter derived therefrom.

4. The apparatus in accordance with claim 1, wherein the load instantaneously taken up by the crane and the instantaneous orientation of the crane is sensed in real time and is provided to the control unit, with the control unit being configured to adapt the maximum permitted torque and/or the parameter derived therefor for the current rotational movement of the slewing gear and the corresponding control or regulation of the limitation circuit in real time.

5. The apparatus in accordance with claim 1, wherein the instantaneous orientation of the crane relates to an instantaneous boom angle, an instantaneous tilt of the crane, and/or an instantaneous slewing gear angle.

6. The apparatus in accordance with claim 1, comprising a simulation means that is configured to calculate the maximum permitted torque and/or the parameter derived therefrom for the current rotational movement of the slewing gear using a physical simulation model of the crane or of at least one crane component while taking account of an instantaneous equipment state, an instantaneous orientation, and an instantaneously raised load of the crane.

7. The apparatus in accordance with claim 1, wherein the control unit is configured to calculate a maximum permitted hydraulic differential pressure and to automatically limit an angular acceleration and/or an angular speed of the slewing gear on its basis by a corresponding control or regulation of the limitation circuit.

8. The apparatus in accordance with claim 1, wherein the brake circuit comprises a first hydraulic store and a brake valve, with the holding brake being connectable via the brake valve to a control pressure line in a first position and to a tank or to the first hydraulic store in a second position.

9. The apparatus in accordance with claim 8, wherein the brake circuit comprises a switchover valve via which the brake valve is connectable to the tank or to the first hydraulic store in the second position.

10. The apparatus in accordance with claim 9, wherein the control connector of the switchover valve is connectable via a first safety valve of the brake circuit to the tank or to a high pressure line of the limitation circuit.

11. The apparatus in accordance with claim 10, wherein the limitation circuit comprises two hydraulic control lines respectively effecting a left hand or right hand rotation of the slewing gear and a hydraulic pressure limitation apparatus that is configured to conductively connect the control lines to one another when the pressure difference in the control lines exceeds a limit pressure depending on the determined maximum permitted torque.

12. The apparatus in accordance with claim 11, wherein the pressure limitation apparatus comprises at least one hydraulic pressure limitation valve via which the control lines are connectable to one another and that is hydraulically controllable via a pre-control line, with the pre-control pressure present in the pre-control line being able to be set via a hydraulic limit pressure circuit in dependence on the determined maximum permitted torque.

13. The apparatus in accordance with claim 12, wherein the limit pressure circuit comprises a differential pressure valve that is configured to connect the pre-control line to a tank on an exceeding of the limit pressure by the pressure difference in the control lines.

14. The apparatus in accordance with claim 13, wherein the limit pressure circuit comprises a second hydraulic store that is connected to the limit pressure line and that is connectable to a control pressure line via a second safety valve.

15. The apparatus in accordance claim 14, wherein the limit pressure circuit comprises a limit pressure setting valve controllable by the control unit and by means of which the limit pressure line is connectable to a control pressure line and the limit pressure is set in dependence on the determined maximum permitted torque.

16. The apparatus in accordance with claim 14, wherein the limitation circuit is configured to automatically disconnect the second hydraulic store from the control line on a failure of the control unit and/or on a triggering of an emergency stop of the slewing gear so that the pressure of the second hydraulic store is present in the limit pressure line.

17. The apparatus in accordance with claim 8, wherein the brake circuit is configured to automatically switch the brake valve into the second position and to connect it to the first hydraulic store and preferably to connect the first hydraulic store to the tank via a restrictor unit on a failure of the control unit and/or on a triggering of an emergency stop of the slewing gear.

18. The apparatus in accordance with claim 11, wherein the high pressure line is connected to the control lines via a valve arrangement such that the higher pressure of the control lines is always present in the high pressure line.

19. The apparatus in accordance with claim 1, wherein an emergency stop function is provided that is automatically triggerable by the control unit by the crane operator and/or on the presence of an emergency stop triggering state, with the power supply being automatically able to be switched off and/or with the slewing gear being able to be automatically brakable by means of the holding brake while maintaining the slewing gear limitation as a consequence of the triggering of the emergency stop function.

20. A crane having a slewing gear and an apparatus for controlling the slewing gear in accordance with claim 1.

21. A method of controlling a crane slewing gear by means of an apparatus in accordance with claim 1, the method comprising the steps:

sensing an instantaneous load taken up by the crane;

sensing an instantaneous orientation of the crane and/or of a crane component;

determining a maximum permitted torque and/or a parameter derived therefrom for a current rotational movement of the slewing gear in dependence on at least the sensed load and the sensed orientation;

controlling or regulating the motor such that the angular acceleration and/or the angular speed of the slewing gear is/are limited to a value dependent on the maximum permitted torque; and on a failure of the control unit or on the triggering of an emergency stop, automatically braking the slewing gear so that the maximum permitted angular acceleration and/or angular speed of the slewing gear/are not exceeded.

* * * * *